US012552336B2

(12) United States Patent
Murata et al.

(10) Patent No.: US 12,552,336 B2
(45) Date of Patent: Feb. 17, 2026

(54) UNDERCARRIAGE WIRING MODULE AND ROUTING STRUCTURE OF UNDERCARRIAGE WIRING MODULE

(71) Applicant: SUMITOMO WIRING SYSTEMS, LTD., Yokkaichi (JP)

(72) Inventors: Takahiro Murata, Yokkaichi (JP); Naofumi Yamatake, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 532 days.

(21) Appl. No.: 18/013,629

(22) PCT Filed: Jun. 30, 2021

(86) PCT No.: PCT/JP2021/024731
§ 371 (c)(1),
(2) Date: Dec. 29, 2022

(87) PCT Pub. No.: WO2022/014330
PCT Pub. Date: Jan. 20, 2022

(65) Prior Publication Data
US 2023/0311792 A1    Oct. 5, 2023

(30) Foreign Application Priority Data

Jul. 13, 2020   (JP) .................................. 2020-119748

(51) Int. Cl.
*B60R 16/03*        (2006.01)
*B60L 1/00*         (2006.01)
(Continued)

(52) U.S. Cl.
CPC .............. *B60R 16/03* (2013.01); *B60L 1/003* (2013.01); *B60R 16/027* (2013.01); *B62D 5/001* (2013.01)

(58) Field of Classification Search
CPC .......... B60R 6/02; B60R 6/0215; B60K 7/007
See application file for complete search history.

(56) References Cited

U.S. PATENT DOCUMENTS 1,922,493 A * 8/1933 Murray .................... B60Q 1/52
                                                    439/15
3,648,491 A * 3/1972 Kennard ................. E05B 79/20
                                                    70/432
(Continued)

FOREIGN PATENT DOCUMENTS

CN        107380258 A     11/2017
CN        107848399 A      3/2018
(Continued)

OTHER PUBLICATIONS

Aug. 22, 2023 Office Action issued in Japanese Patent Application No. 2020-119761.

(Continued)

*Primary Examiner* — Paresh Paghadal
(74) *Attorney, Agent, or Firm* — Oliff PLC

(57) ABSTRACT

An undercarriage wiring module includes: a wiring member connecting a vehicle body side apparatus and a vehicle wheel side apparatus; and a support member supporting the wiring member, wherein the wiring member includes a plurality of wire-like transmission members, the wiring member includes a parallel section in which at least two of the plurality of wire-like transmission members are parallelly arranged, and in the parallel section, the at least two of the plurality of wire-like transmission members are parallelly arranged to extend along an identical route along a steering rotation central axis.

5 Claims, 6 Drawing Sheets

(51) Int. Cl.
*B60R 16/027* (2006.01)
*B62D 5/00* (2006.01)

(56) References Cited

U.S. PATENT DOCUMENTS

| | | | |
|---|---|---|---|
| 4,383,148 A | | 5/1983 | Arima et al. |
| 4,741,713 A | * | 5/1988 | Ohlsson ................. B63H 20/10 440/2 |
| 5,450,320 A | | 9/1995 | Tsubaki et al. |
| 2007/0234559 A1 | | 10/2007 | Tokuda et al. |
| 2008/0078317 A1 | | 4/2008 | Furuya et al. |
| 2008/0078607 A1 | * | 4/2008 | Pattok ..................... B62D 3/12 180/444 |
| 2009/0101429 A1 | | 4/2009 | Williams |
| 2009/0321171 A1 | * | 12/2009 | Hakansson ............ B62D 1/183 296/190.08 |
| 2013/0009450 A1 | | 1/2013 | Suzuki et al. |
| 2013/0234425 A1 | * | 9/2013 | Skowronek .............. B62D 1/16 280/93.502 |
| 2013/0277128 A1 | | 10/2013 | Gillett |
| 2013/0284528 A1 | | 10/2013 | Kawasaki et al. |
| 2014/0318879 A1 | | 10/2014 | Gillett |
| 2016/0083003 A1 | | 3/2016 | Huang et al. |
| 2017/0369007 A1 | | 12/2017 | Tamura et al. |
| 2019/0077342 A1 | | 3/2019 | Okamoto et al. |
| 2019/0111747 A1 | | 4/2019 | Ishikawa et al. |
| 2019/0111865 A1 | | 4/2019 | Tamura et al. |
| 2019/0152505 A1 | * | 5/2019 | Hansen .................... B60R 7/043 |
| 2024/0059233 A1 | * | 2/2024 | Masakiyo .............. H02G 11/00 |

FOREIGN PATENT DOCUMENTS

| | | | |
|---|---|---|---|
| CN | 107848403 A | | 3/2018 |
| CN | 107895605 A | | 4/2018 |
| CN | 110341461 A | | 10/2019 |
| DE | 197 56 057 A1 | | 7/1999 |
| DE | 199 00 083 A1 | | 7/2000 |
| DE | 102009023527 | * | 5/2009 ............... B62D 5/04 |
| DE | 102009023527 A1 | * | 12/2010 ........... B60R 16/027 |
| EP | 3 441 251 | | 2/2019 |
| EP | 3 778 268 | | 2/2021 |
| JP | H06-135253 A | | 5/1994 |
| JP | 2005-271909 A | | 10/2005 |
| JP | 2006-62388 A | | 3/2006 |
| JP | 2006-240430 A | | 9/2006 |
| JP | 2007-313984 A | | 12/2007 |
| JP | 2008-308033 A | | 12/2008 |
| JP | 2011-201375 A | | 10/2011 |
| JP | 2013-147084 A | | 8/2013 |
| JP | 2013-209016 A | | 10/2013 |
| JP | 2014-189107 A | | 10/2014 |
| JP | 2015-137065 A | | 7/2015 |
| JP | 2016-063608 A | | 4/2016 |
| JP | 2016-088269 A | | 5/2016 |
| JP | 2016-107659 A | | 6/2016 |
| JP | 2017-190117 A | | 10/2017 |
| JP | 2017-200287 A | | 11/2017 |
| JP | 2018-065545 A | | 4/2018 |
| JP | 2020-104766 A | | 7/2020 |
| WO | 99/30955 A1 | | 6/1999 |
| WO | 2011/115219 A1 | | 9/2011 |
| WO | 2017175409 A1 | | 10/2017 |
| WO | 2018/143144 A1 | | 8/2018 |
| WO | 2022/014477 A1 | | 1/2022 |

OTHER PUBLICATIONS

Dec. 4, 2024 Office Action issued in U.S. Appl. No. 18/013,621.
Aug. 22, 2023 Office Action issued in Japanese Patent Application No. 2020-119758.
Dec. 5, 2023 Office Action issued in Japanese Patent Application No. 2020-119749.
Jul. 4, 2023 Office Action issued in Japanese Patent Application No. 2020-119749.
Jul. 4, 2023 Office Action issued in Japanese Patent Application No. 2020-119748.
Jul. 25, 2023 Office Action issued in Japanese Patent Application No. 2020-119752.
Feb. 18, 2025 Notice of Allowance issued in U.S. Appl. No. 18/014,041.
Mar. 5, 2025 Notice of Allowance issued in U.S. Appl. No. 18/013,621.
Apr. 8, 2025 Office Action issued in Chinese Patent Application No. 202180046018.3.
Sep. 5, 2024 Office Action issued in U.S. Appl. No. 18/013,621.
Sep. 24, 2024 Office Action issued in U.S. Appl. No. 18/014,041.
Dec. 26, 2023 Office Action issued in Japanese Patent Application No. 2020-119761.
Oct. 18, 2024 Office Action issued in Chinese Patent Application No. 202180046018.3.
Mar. 27, 2025 Office Action issued in U.S. Appl. No. 18/013,943.
Apr. 8, 2025 Office Action issued in Japanese Patent Application No. 2024-072822.
Jun. 3, 2025 Office Action issued in Japanese Patent Application No. 2020-119758.
Sep. 7, 2021 International Search Report issued in International Patent Application No. PCT/JP2021/024731.
Sep. 7, 2021 International Search Report issued in International Patent Application No. PCT/JP2021/025916.
Sep. 7, 2021 International Search Report issued in International Patent Application No. PCT/JP2021/025917.
Sep. 14, 2021 International Search Report issued in International Patent Application No. PCT/JP2021/025883.
Sep. 28, 2021 International Search Report issued in International Patent Application No. PCT/JP2021/026063.
Jan. 17, 2023 International Preliminary Report on Patentability issued in International Patent Application No. PCT/JP2021/026063.
Jan. 17, 2023 International Preliminary Report on Patentability issued in International Patent Application No. PCT/JP2021/025883.
Jan. 17, 2023 International Preliminary Report on Patentability issued in International Patent Application No. PCT/JP2021/024731.
Jan. 17, 2023 International Preliminary Report on Patentability issued in International Patent Application No. PCT/JP2021/025916.
Jan. 17, 2023 International Preliminary Report on Patentability issued in International Patent Application No. PCT/JP2021/025917.
U.S. Appl. No. 18/014,041, filed Dec. 30, 2022 in the name of Murata et al.
U.S. Appl. No. 18/013,943, filed Dec. 30, 2022 in the name of Murata et al.
U.S. Appl. No. 18/013,714, filed Dec. 29, 2022 in the name of Murata et al.
U.S. Appl. No. 18/013,621, filed Dec. 29, 2022 in the name of Murata et al.
Jun. 26, 2025 Office Action issued in Chinese Patent Application No. 202180046018.3.
Jul. 10, 2025 Office Action issued in Chinese Patent Application No. 202180048225.2.
Jul. 10, 2025 Office Action issued in Chinese Patent Application No. 202180046379.8.
Nov. 18, 2025 Office Action issued in U.S. Appl. No. 18/013,714.
Sep. 29, 2025 Office Action issued in Chinese Patent Application No. 202180048232.2.
Sep. 30, 2025 Office Action issued in Chinese Patent Application No. 202180045715.7.

* cited by examiner

UNDERCARRIAGE WIRING MODULE AND ROUTING STRUCTURE OF UNDERCARRIAGE WIRING MODULE

TECHNICAL FIELD

The present disclosure relates to an undercarriage wiring module and a routing structure of an undercarriage wiring module.

BACKGROUND ART

Patent Document 1 discloses a power cable for an in-wheel motor. Ends of three power cables on a side of a vehicle body are clamped by a clamp member. Ends of three power cables on a side of a motor are connected to a power cable terminal box provided to an in-wheel motor drive device.

PRIOR ART DOCUMENTS

Patent Document(s)

Patent Document 1: Japanese Patent Application Laid-Open No. 2018-65545

SUMMARY

Problem to be Solved by the Invention

According to the technique disclosed in Patent Document 1, there is a possibility that force acts on three power cables in directions different from each other while three power cables are routed toward a vehicle wheel.

Accordingly, an object of the present disclosure is to provide a technique of making force hardly act on a plurality of wire-like transmission members in directions different from each other.

Means to Solve the Problem

An undercarriage wiring module according to the present disclosure is an undercarriage wiring module including: a wiring member connecting a vehicle body side apparatus and a vehicle wheel side apparatus; and a support member supporting the wiring member, wherein the wiring member includes a plurality of wire-like transmission members, the wiring member includes a parallel section in which at least two of the plurality of wire-like transmission members are parallelly arranged, and in the parallel section, the at least two of the plurality of wire-like transmission members are parallelly arranged to extend along a same route when viewed along a steering rotation central axis.

Effects of the Invention

According to the present disclosure, force hardly acts on the plurality of wire-like transmission members in different directions.

DESCRIPTION OF EMBODIMENT(S)

Description of Embodiment of Present Disclosure

Figure 1:
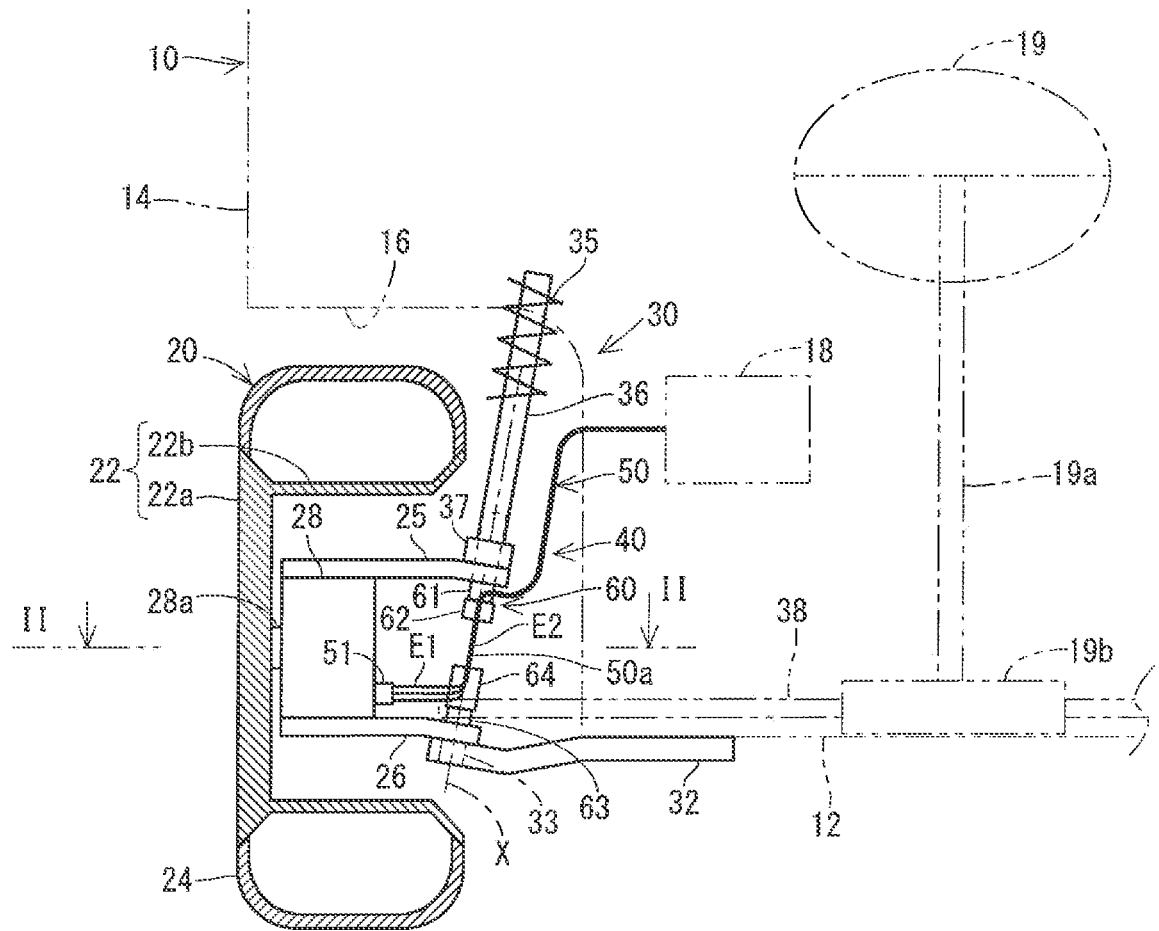
FIG. 1 is a schematic cross-sectional view illustrating a routing structure of an undercarriage wiring module.

Embodiments of the present disclosure are listed and described firstly.

An undercarriage wiring module according to the present disclosure is as follows.

(1) An undercarriage wiring module includes: a wiring member connecting a vehicle body side apparatus and a vehicle wheel side apparatus; and a support member supporting the wiring member, wherein the wiring member includes a plurality of wire-like transmission members, the wiring member includes a parallel section in which at least two of the plurality of wire-like transmission members are parallelly arranged, and in the parallel section, the at least two of the plurality of wire-like transmission members are parallelly arranged to extend along a same route when viewed along a steering rotation central axis. According to the present undercarriage wiring module, force hardly acts on the plurality of wire-like transmission members in the different directions.

(2) In the undercarriage wiring module according to (1), the at least two of the plurality of wire-like transmission members may be power source wires. Force hardly acts on the plurality of power source wires which tend to be thick in the different directions.

(3) The undercarriage wiring module according to (1) or (2), it is also applicable that the support member supports the wiring member so that the wiring member goes through the steering rotation central axis, and the parallel section is set between the steering rotation central axis and the vehicle wheel side apparatus in the wiring member. When viewed along the steering rotation central axis, the wiring member is disposed with a short distance from the steering rotation central axis toward the vehicle wheel side apparatus. When the vehicle wheel is rotated with steering, the distance between the plurality of wire-like transmission members is hardly changed, and the wiring member itself is hardly deformed to be bent.

(4) The undercarriage wiring module according to (3), the support member may support the wiring member so that a part of the wiring member extends along the steering rotation central axis. A wide range of a portion of the wiring member extending along the steering rotation central axis can be twisted in accordance with the rotation of the vehicle wheel with steering, thus the wiring member has a longer life.

(5) The undercarriage wiring module according to (3) or (4), a portion of the wiring member extending along the steering rotation central axis may be formed into a shape closer to a circle than an outer shape of the wiring member in the parallel section. A portion of the wiring member extending along the steering rotation central axis can be easily twisted.

A routing structure of an undercarriage wiring module according to the present disclosure is as follows.

(6) A routing structure of an undercarriage wiring module includes a wiring member connecting a vehicle body side apparatus and a vehicle wheel side apparatus, wherein the wiring member includes a plurality of wire-like transmission members, the wiring member includes a parallel section in which at least two of the plurality of wire-like transmission members are parallelly arranged, and in the parallel section, the at least two of the plurality of wire-like transmission members are parallelly arranged to extend along an identical route when viewed along a steering rotation central axis. According to the present routing structure of the undercarriage wiring module, force hardly acts on the plurality of wire-like transmission members in the different directions.

Details of Embodiment of Present Disclosure

An undercarriage wiring module and a routing structure of an undercarriage wiring module according to the present disclosure are described with reference to the drawings. The present disclosure is not limited to these examples, but is indicated by claims, and it is intended that meanings equivalent to claims and all modifications within a scope of claims are included.

Embodiment

Figure 2:
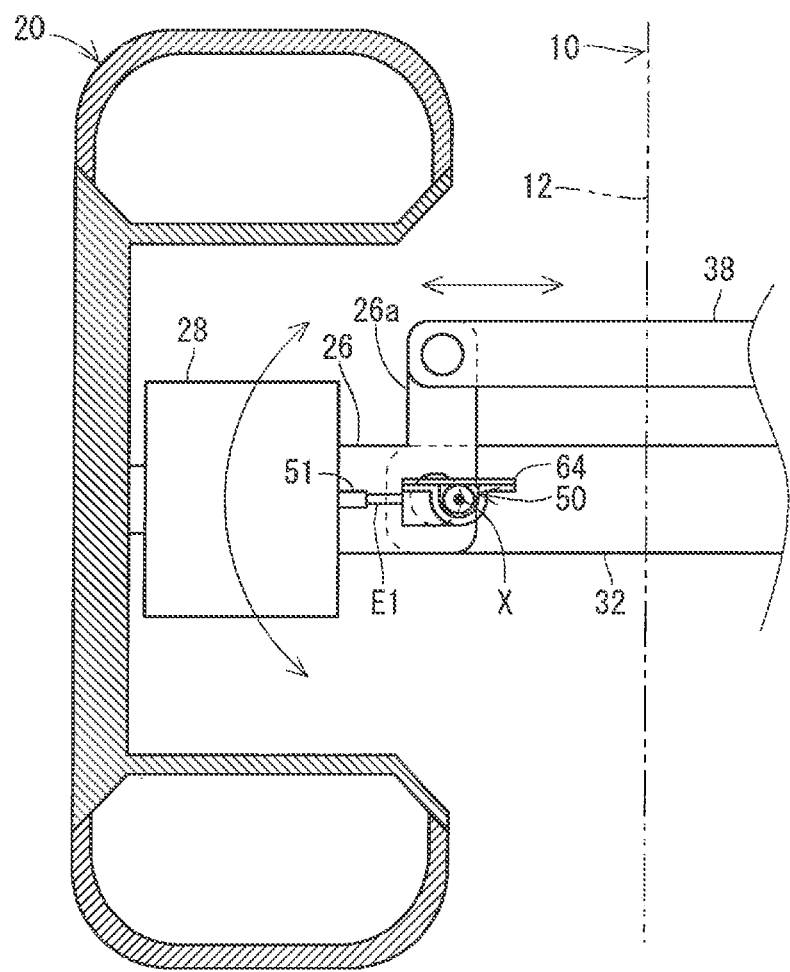
FIG. 2 is a II-II line schematic cross-sectional view in FIG. 1.
Figure 3:
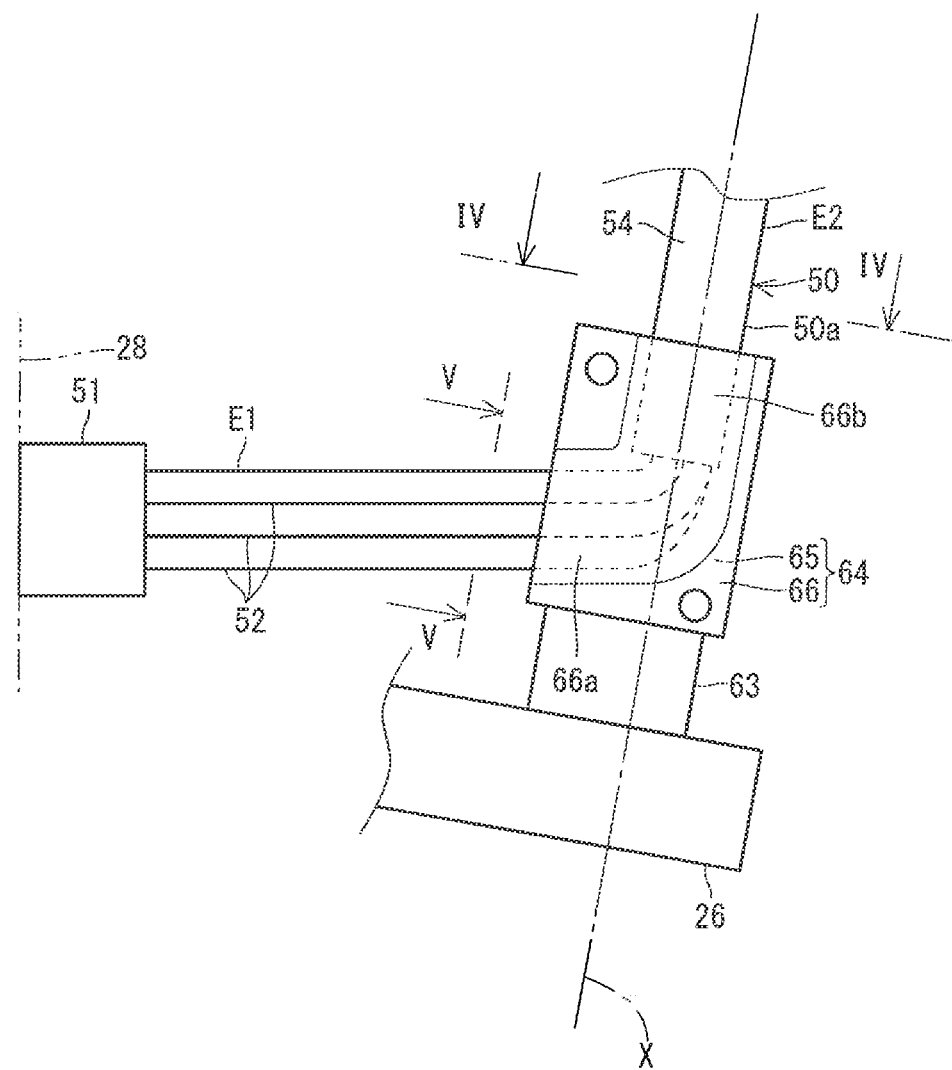
FIG. 3 is a perspective view illustrating a support member.
Figure 4:
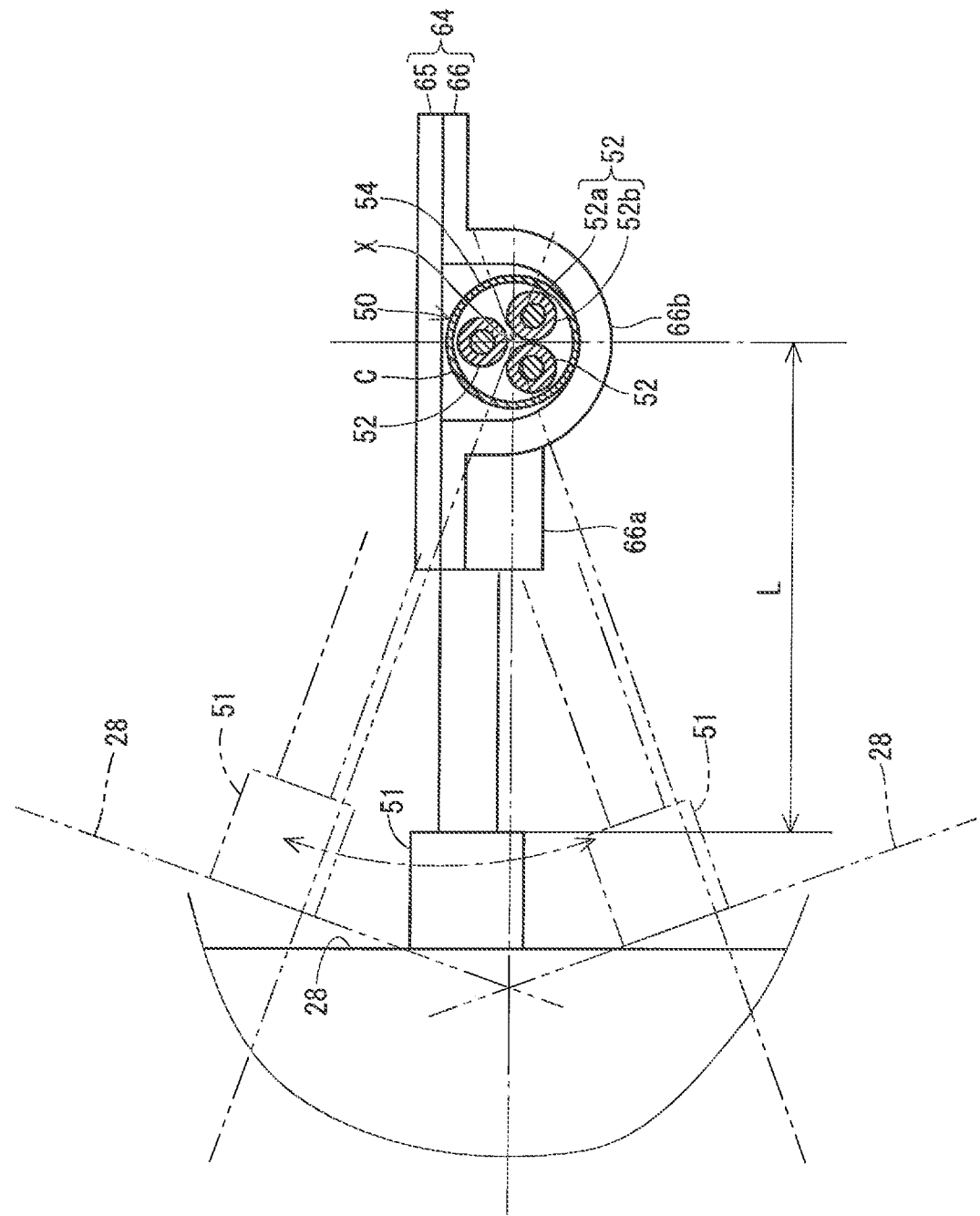
FIG. 4 is a IV-IV line schematic cross-sectional view in FIG. 3.
Figure 5:
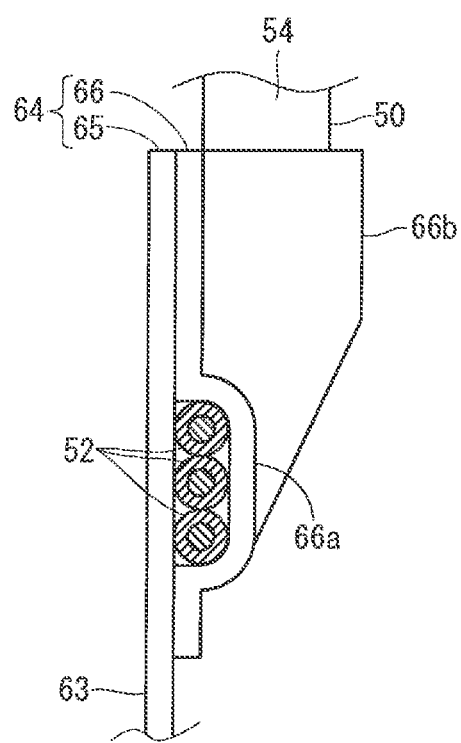
FIG. 5 is a V-V line schematic cross-sectional view along in FIG. 3.

An undercarriage wiring module and a routing structure of an undercarriage wiring module according to an embodiment are described hereinafter. FIG. 1 is a schematic cross-sectional view illustrating a routing structure 30 of an undercarriage wiring module 40. FIG. 1 is a schematic cross-sectional view of a plane perpendicular to a front-back direction of a vehicle body 10 and passing through a central axis of a vehicle wheel 20. FIG. 2 is a II-II line schematic cross-sectional view in FIG. 1. FIG. 3 is a perspective view illustrating a support member 60. FIG. 4 is a IV-IV line schematic cross-sectional view in FIG. 3. A position of the wiring member 50 in a case where the vehicle wheel 20 is rotated around the steering rotation central axis X is illustrated by a virtual line in FIG. 4. FIG. 5 is a V-V line schematic cross-sectional view in FIG. 3.

The undercarriage wiring module 40 includes the wiring member 50 and a support member 60. The wiring member 50 is a wiring member connecting a vehicle body side apparatus 18 and a vehicle wheel side apparatus 28. The wiring member 50 is routed along a route connecting the vehicle body side apparatus 18 and the vehicle wheel side apparatus 28. The support member 60 is a member supporting the wiring member 50 so that the wiring member 50 is routed along a predetermined route.

A configuration of a portion where the undercarriage wiring module 40 is routed is described for convenience of description.

The vehicle body 10 in which a part of the undercarriage wiring module 40 is routed is a vehicle body of an automobile. FIG. 1 illustrates a portion around the vehicle wheel 20 on a front side in the vehicle body 10. The undercarriage wiring module 40 is assumed to be used for the vehicle wheel 20 steered with steering. Thus, the vehicle wheel 20 is a front wheel. The undercarriage wiring module may be used for a rear wheel when the rear wheel is steered.

The vehicle body 10 includes a floor part 12 and a body part 14. The floor part 12 is a portion facing a ground. The body part 14 is provided to an upper side of the floor part 12 to constitute an exterior of the vehicle body 10. The vehicle body 10 may be a monocoque body made up of a frame and a body as rigid bodies integrated with each other, or may have a configuration in which a body is mounted on a frame. In the present embodiment, a travel direction in a case where an automobile normally travels is referred to as a front, and a side opposite thereto is referred to as a back in some cases.

The vehicle wheel 20 is rotatably supported by the vehicle body 10. In the example illustrated in FIG. 1, the vehicle wheel 20 is rotatably supported in a fender apron 16. Any suspension type such as an independent suspension type, for example, may be applied to a suspension device to support the vehicle wheel 20. FIG. 1 illustrates an example that a lower arm 32 and a dumper 36 support the vehicle wheel 20. A suspension device illustrated in FIG. 1 is a strut-type suspension device as a type of an independent suspension system.

More specifically, the vehicle wheel 20 includes a wheel 22 and a tire 24. The wheel 22 is formed of metal such as iron or aluminum. The wheel 22 includes a disk part 22a and a tire attachment part 22b. The disk part 22a is formed into a circular plate-like shape. The tire attachment part 22b is an annular portion protruding from a surrounding area of the disk part 22a to an inner side in a vehicle width direction. An annular rim protrudes on both side edges of the tire attachment part 22b. The tire 24 formed by an elastic member such as rubber is attached to an outer periphery of the tire attachment part 22b described above.

The vehicle wheel side apparatus 28 is provided to the vehicle wheel 20 described above. Description herein is based on an assumption that the vehicle wheel side apparatus 28 is an in-wheel motor. The in-wheel motor is a motor for traveling incorporated into the vehicle wheel 20 to rotate the vehicle wheel 20. Herein, a shaft 28a of the vehicle wheel side apparatus (in-wheel motor) 28 is connected to a central portion of the disk part 22a while the vehicle wheel side apparatus 28 is disposed in the tire attachment part 22b. Accordingly, the vehicle wheel side apparatus 28 is integrally incorporated into the vehicle wheel 20.

An upper knuckle part 25 and a lower knuckle part 26 are attached to the vehicle wheel side apparatus 28. The upper knuckle part 25 extends toward an inner side in the vehicle width direction from an upper portion of the vehicle wheel side apparatus 28. The lower knuckle part 26 extends toward the inner side in the vehicle width direction from a lower portion of the vehicle wheel side apparatus 28. An arm part 26a receiving force of steering is provided to protrude on the lower knuckle part 26. Herein, the arm part 26a extends backward from the inner side in the vehicle width direction in the lower knuckle part 26. When the vehicle wheel side apparatus 28 is not the in-wheel motor, the upper knuckle part 25 and the lower knuckle part 26 described above extend to the inner side in the vehicle width direction from a bearing part rotatably supporting the vehicle wheel 20 in some cases.

The lower arm 32 is a member formed by metal, for example. A base end portion of the lower arm 32 is swingably supported on the floor part 12 in a position on the inner side in the vehicle width direction of the vehicle wheel 20. The axis as a center of swing of the base end portion of the lower arm 32 extends in a front-back direction of the vehicle body 10. The base end portion of the lower arm may be swingably supported on the floor part on an obliquely front side, an inner side, an obliquely back side, or a back side of the vehicle wheel. In these cases, a rotational axis of the swing of the lower arm may extend in a right-left direction of the vehicle body, a front-back direction, or an oblique direction with respect to both the right-left direction and the front-back direction.

A tip end portion of the lower arm 32 extends toward an inner side of the fender apron 16 (herein, toward an outer side in the vehicle width direction) from the floor part 12. A bearing part 33 is provided to the tip end portion of the lower arm 32. The lower knuckle part 26 is rotatably supported on the tip end portion of the lower arm 32 via the bearing part 33. A rotational axis of the bearing part 33 is the steering rotation central axis X around which the vehicle wheel 20 is rotated in the fender apron 16.

The spring 35 and the dumper 36 are provided between the upper knuckle part 25 and the vehicle body 10. More specifically, an upper end portion of the dumper 36 is supported on the vehicle body 10 on an upper side of the vehicle wheel 20. The upper knuckle part 25 is rotatably supported on the lower end portion of the dumper 36 via a bearing part 37. A rotational axis of the bearing part 37 is the steering rotation central axis X around which the vehicle wheel 20 is rotated in the fender apron 16.

As described above, the base end portion of the lower arm 32 is swingably supported on the floor part 12, thus the lower arm 32 supports the vehicle wheel 20 to be movable in an up-down direction in the fender apron 16. The dumper 36 intervenes between the upper knuckle part 25 and the vehicle body 10 while a movement direction of the vehicle wheel 20 is regulated by the lower arm 32. The dumper 36 and the spring 35 externally mounted to the dumper 36 absorb impact by concave-convex portions of a road surface in traveling.

In the present embodiment, a rotational axis of the bearing part 33 and a rotational axis of the bearing part 37 are located on the steering rotation central axis X of the vehicle wheel 20. A central axis of the dumper 36 is also located on the steering rotation central axis X of the vehicle wheel 20. The central axis of the dumper needs not coincide with the steering rotation central axis X.

A tie rod 38 is connected to a tip end portion of the arm part 26a. When a steering wheel 19 is rotated with steering by a driver, a rotational movement thereof is transmitted to the tie rod 38 as a movement in the vehicle width direction via a transmission mechanism 19b such as a steering shaft 19a and a rack-and-pinion mechanism. When the tie rod 38 is moved in the vehicle width direction, the lower knuckle part 26 can be rotated around the rotational axis of the bearing part 33 (that is to say, the steering rotation central axis X). Accordingly, the vehicle wheel 20 can be rotated around the steering rotation central axis X with the steering. A travel direction of the vehicle body 10 is changed by the rotation of the vehicle wheel 20 around the steering rotation central axis X. That is to say, the steering rotation central axis X may be a central axis around which the vehicle wheel 20 is rotated by an operation of the steering wheel 19. The steering rotation central axis X may also be considered an axis closer to a gravity direction than a horizontal direction. The steering rotation central axis X may also be considered a central axis around which the vehicle wheel 20 is rotated to change the travel direction of the vehicle body 10.

The vehicle body side apparatus 18 is provided to a side of the vehicle body 10, and the vehicle wheel side apparatus 28 is provided to a side of the vehicle wheel 20. The vehicle wheel side apparatus 28 is an apparatus incorporated into the vehicle wheel 20 and rotated around the steering rotation central axis X together with the vehicle wheel 20 with respect to the vehicle body 10. As described above, when the vehicle wheel side apparatus 28 is assumed to be the in-wheel motor, the vehicle body side apparatus 18 is assumed to be a drive unit driving the in-wheel motor. For example, when the in-wheel motor is a three-phase induction motor, the vehicle body side apparatus 18 is assumed to be an inverter unit for supplying three-phase alternating current of U phase, V phase, and W phase for driving the in-wheel motor. The vehicle body side apparatus 18 is an apparatus which is provided to the vehicle body 10, and is not rotated even when the vehicle wheel 20 is rotated around the steering rotation central axis X.

The vehicle wheel side apparatus 28 is not necessarily the in-wheel motor. The vehicle wheel side apparatus 28 is assumed to be a sensor or an electrical brake, for example, in place of or in addition to the in-wheel motor. The sensor may be a sensor detecting a rotation speed of a vehicle wheel, for example. The sensor may be a temperature sensor detecting a temperature of an in-wheel motor, for example. The vehicle wheel side apparatus 28 may be an electrical brake including a motor, for example, and performing braking on the rotation of the vehicle wheel 20 using electricity as power. The electrical brake may be an electrical parking brake used in parking or stopping an automobile or a brake used in traveling of an automobile. It is sufficient that the vehicle body side apparatus 18 is an apparatus transmitting or receiving a signal between these vehicle wheel side apparatuses 28 or supplying electrical power. For example, the vehicle body side apparatus 18 may include a function as an electronic control unit (ECU) receiving a signal from a sensor or controlling the electrical brake described above. The vehicle body side apparatus 18 may be provided inside or outside the vehicle body 10. Herein, the vehicle body side apparatus 18 is provided inside the vehicle body 10.

The wiring member 50 includes a plurality of wire-like transmission members transmitting electrical power or light. One end portion of the wiring member 50 is connected to the vehicle body side apparatus 18. The other end portion of the wiring member 50 is connected to the vehicle wheel side apparatus 28. FIG. 4 and FIG. 5 illustrate an example that the wiring member 50 includes a plurality of power source wires 52. The power source wire 52 is an electrical wire in which a covering 52b is formed around a core wire 52a. The power source wire 52 is a power source wire supplying three-phase alternating current to the in-wheel motor, for example, and FIG. 3 to FIG. 5 illustrate three power source wires 52. The wiring member may include a signal wire for a sensor or for control in place of or in addition to the power source wire 52. The wiring member 50 may include an optical fiber cable in place of or in addition to an electrical conductor.

One end portion of the wiring member 50 may be connector-connected to the vehicle body side apparatus 18. The wiring member 50 may be directly drawn from the vehicle body side apparatus 18. One end portion of the wiring member 50 may be connected to the vehicle body side apparatus 18 via the other wiring member.

The other end portion of the wiring member 50 may be connected to the vehicle wheel side apparatus 28 via the connector 51. The other end portion of the wiring member 50 may be directly connected to the vehicle wheel side apparatus 28 without intervention of the connector. The plurality of electrical wires may be branched and connected to the other positions, respectively, in the other portion of the wiring member 50.

The wiring member 50 is routed to go through the steering rotation central axis X. Herein, the support member 60 supports the wiring member 50 so that the wiring member 50 goes through the steering rotation central axis X. Herein, the state where the wiring member 50 goes through the steering rotation central axis X indicates that there is a positional relationship that the steering rotation central axis X goes through an area in a minimum inclusion circle C in at least one transverse-sectional surface of the wiring member 50 in the longitudinal direction. The minimum inclusion circle C is a minimum circle which can include a portion of the wiring member 50 appearing in the transverse-sectional surface. For example, when the transverse-sectional shape of the wiring member 50 is a circular shape, an outer circle of the wiring member 50 appearing in the transverse-sectional surface is the minimum inclusion circle C. The case where the steering rotation central axis X goes through the area in the minimum inclusion circle C includes a case where the steering rotation central axis X goes through a boundary line of the minimum inclusion circle.

It is sufficient that the steering rotation central axis X goes through the area in the minimum inclusion circle C, thus the case where the wiring member 50 goes through the steering rotation central axis X includes a case where the wiring member 50 intersects with the steering rotation central axis X and a case where a part of the wiring member 50 is in a state of extending along the steering rotation central axis X. FIG. 1 illustrates an example that a part 50a of the wiring member 50 is in a state of extending along the steering rotation central axis X. It is sufficient that the steering rotation central axis X goes through the minimum inclusion circle C, thus the central axis of the wiring member 50 and the steering rotation central axis X need not coincide with each other in a portion of the wiring member 50 extending along the steering rotation central axis X.

That is to say, any positional relationship is applicable as long as the steering rotation central axis X goes through the area in the minimum inclusion circle C in the transverse-sectional surface of the wiring member 50 in a portion of the wiring member 50 going through the steering rotation central axis X (intersecting portion) or a portion of the wiring member 50 extending along the steering rotation central axis X.

It is preferable to increase a length of the portion of the wiring member 50 extending along the steering rotation central axis X to suppress bending deformation of the wiring member 50.

The state where the support member 60 supports the wiring member 50 so that the wiring member 50 goes through the steering rotation central axis X includes both cases where the wiring member 50 can be moved and cannot be moved along an extension direction of the steering rotation central axis X while going through the steering rotation central axis X.

The wiring member 50 is not necessarily routed to go through the steering rotation central axis X. The wiring member 50 may be routed to go through a position away from the steering rotation central axis X. Even in this case, the plurality or power source wires 52 can be easily deformed together in accordance with the rotation of the vehicle wheel 20 around the steering rotation central axis X as long as the plurality of power source wires 52 are parallelly arranged to extend along the same route when viewed along the steering rotation central axis X.

Any member is applicable as the support member 60 as long as it supports at least a part of the wiring member 50, and a configuration therefor is not particularly limited. The support member may include a plurality of support members or may be a single support member. The support member may be supported on a side of the vehicle body 10 or a side of the vehicle wheel 20. Herein, the state where the support member is supported on the side of the vehicle body 10 indicates that the support member is supported in a portion which is not rotated even when the vehicle wheel 20 is rotated around the steering rotation central axis X. For example, applied is a case where the support member is supported by the dumper 36 or the lower arm 32 described above. The state where the support member is supported on the side of the vehicle wheel 20 indicates that the support member is supported in a portion rotated in accordance with a rotation of the vehicle wheel 20 around the steering rotation central axis X. For example, applied is a case where the support member is supported by the upper knuckle part 25 or the lower knuckle part 26 described above.

In the present embodiment, the support member 60 includes an upper support part 62 and a lower support part 64. The lower support part 64 is provided to a lower side of the upper support part 62. The wiring member 50 is supported by the upper support part 62 and the lower support part 64, thus the wiring member 50 goes through the steering rotation central axis X between the upper support part 62 and the lower support part 64.

More specifically, the upper support part 62 and the lower support part 64 are provided between a tip end portion of the upper knuckle part 25 and a tip end portion of the lower knuckle part 26. The tip end portion of the upper knuckle part 25, the upper support part 62, the lower support part 64, and the tip end portion of the lower knuckle part 26 are arranged in this order from an upper side to a lower side at intervals along the steering rotation central axis X.

The upper support part 62 is supported on the tip end portions of the dumper 36 by an extension support part 61. The extension support part 61 detours from the tip end portion of the upper knuckle part 25 while being directed from the lower end portion of the dumper 36 to the lower side in a posture in parallel to the steering rotation central axis X. The extension support part 61 may be fixed to the dumper 36 by welding or screwing, for example. A tip end portion of the extension support part 61 is located on an upper side of the lower support part 64.

The upper support part 62 is supported on the tip end portion of the extension support part 61. The upper support part 62 may be integrally formed with the extension support part 61, or may also be fixed to the extension support part 61 by welding or screwing, for example. The upper support part 62 is provided in a position on the lower side away from the tip end portion of the upper knuckle part 25 along the steering rotation central axis X. In this arrangement position, the upper support part 62 supports a part of the wiring member 50 at a position on the steering rotation central axis X. It is sufficient that the upper support part 62 supports a part of the wiring member 50 in a constant position. For example, the upper support part 62 may be an annular member having a hole into which the wiring member 50 is inserted. The upper support part 62 may have a configuration that a pair of sandwiching pieces are screwed while sandwiching a part of the wiring member 50. The upper support part 62 may have a configuration of having a swaging piece swaged and fixed to a part of the wiring member 50. The upper support part 62 may support a part of the wiring member 50 while not allowing a rotation thereof.

The upper support part 62 is supported by the dumper 36 via the extension support part 61, thus do not follow the rotation of the vehicle wheel 20 around the steering rotation central axis X. Accordingly, the upper support part 62 is supported on the side of the vehicle body 10.

The lower support part 64 is supported on the tip end portion of the lower knuckle part 26 by the extension support part 63. The extension support part 63 is directed to an upper side in a posture in parallel to the steering rotation central axis X at a position adjacent to the steering rotation central axis X from the tip end portion of the lower knuckle part 26.

The extension support part 63 may be fixed to the lower knuckle part 26 by welding or screwing, for example. The tip end portion of the extension support part 63 is located on a lower side of the upper support part 62.

The lower support part 64 is supported on the tip end portion of the extension support part 63. The lower support part 64 may be integrally formed with the extension support part 63, or may also be fixed to the extension support part 63 by welding or screwing, for example. The lower support part 64 is provided in a position on the upper side away from the tip end portion of the lower knuckle part 26 along the steering rotation central axis X. In this arrangement position, the lower support part 64 supports a part of the wiring member 50 at a position on the steering rotation central axis X.

The lower support part 64 supports a part of the wiring member 50 in a constant position. The lower support part 64 may have a configuration of holding a part of the wiring member 50 directed from the lower support part 64 to the vehicle wheel side apparatus 28 in a constant posture around the axis thereof. An example of the lower support part 64 is further described hereinafter in a relationship with the wiring member 50.

The lower support part 64 is supported on the lower knuckle part 26 via the extension support part 63, thus is rotated in accordance with the rotation of the vehicle wheel 20 around the steering rotation central axis X. Accordingly, the lower support part 64 is supported on the side of the vehicle wheel 20.

The wiring member 50 extends from the vehicle body side apparatus 18 in the vehicle body 10 to pass through the fender apron 16, and is led toward the tip end portion of the upper knuckle part 25. In the tip end portion of the upper knuckle part 25, the wiring member 50 goes through an area between the tip end portion of the upper knuckle part 25 and the upper support part 62, and is supported on the steering rotation central axis X by the upper support part 62. Furthermore, the wiring member 50 is led toward the lower support part 64, and is supported on the steering rotation central axis X by the lower support part 64. A portion of the wiring member 50 between the upper support part 62 and the lower support part 64 is a portion supported along the steering rotation central axis X. Furthermore, the wiring member 50 goes through the area between the lower support part 64 and the tip end portion of the lower knuckle part 26 to extend toward the vehicle wheel side apparatus 28, and is connected to the vehicle wheel side apparatus 28 via the connector 51.

When the lower support part 64 rotatably supports the wiring member 50, twist of the wiring member 50 caused by the rotation of the vehicle wheel 20 around the steering rotation central axis X can be transmitted to the portion of the wiring member 50 between the lower support part 64 and the upper support part 62. When the upper support part 62 supports the wiring member 50 while not allowing the rotation of the wiring member 50, the twist of the wiring member 50 is hardly transmitted to the portion of the wiring member 50 on the side of the vehicle body 10 compared with the upper support part 62.

A wiring member 50 includes a parallel section E1 in which at least two of the plurality of wire-like transmission members are parallelly arranged. In this parallel section E1, at least two wire-like transmission members are parallelly arranged to extend along the same route when viewed along the steering rotation central axis X.

As described above, the wiring member 50 may go or may not go through the steering rotation central axis X. When the wiring member 50 goes through the steering rotation central axis X, it is also applicable that in the parallel section E1, at least two wire-like transmission members extend along a direction intersecting with the steering rotation central axis X, and are further parallelly arranged on a virtual plane through which the steering rotation central axis X passes (for example, refer to a paper sheet in FIG. 3). In this case, at least two wire-like transmission members and the steering rotation central axis X in the parallel section E1 may be considered to be located on the same virtual plane (for example, refer to the paper sheet in FIG. 3). Two wire-like transmission members may be considered to intersect with the steering rotation central axis X when elongated in the parallel section E1.

At least two wire-like transmission members need not be strictly overlapped with each other on the same route when viewed along the steering rotation central axis X, but may be partially overlapped with each other in a width direction in accordance with a difference of a thickness therebetween or a deviation in the width direction, for example.

Herein, a plurality of power source wires to be parallelly arranged in the parallel section E1 are the plurality of (three herein) power source wires 52. The wiring member 50 may include a wire-like transmission member which is not the power source wire to be parallelly arranged. Examples thereof include a case where the wiring member 50 includes a power source wire for driving a brake, a signal wire for a sensor, or a signal wire for control. In these cases, it is sufficient that at least two of the plurality of wire-like transmission members are parallelly arranged in the parallel section E1 as the wire-like transmission members to be parallelly arranged. When at least two of the plurality of wire-like transmission members are the wire-like transmission members to be parallelly arranged, wire-like transmission members which are hardly bended may be the power source wire to be parallelly arranged. For example, a plurality of electrical wires each having a largest diameter such as power source wires may be wire-like transmission members to be parallelly arranged. A thick wire is used as the power source wire 52 for an in-wheel motor in many cases, thus can be selected as the power source wire to be parallelly arranged. The wire-like transmission member such as the other signal wire, for example, may be provided in any position with respect to the plurality of power source wires parallelly arranged.

The parallel section E1 in the wiring member 50 may be achieved by a configuration described hereinafter. That is to say, the parallel section E1 is set between the lower support part 64 and the vehicle wheel side apparatus 28 in the wiring member 50.

The lower support part 64 includes a base plate part 65 and a press plate part 66 fixed to be overlapped with the base plate part 65. The press plate part 66 is fixed to the base plate part 65 by screwing or swaging, for example.

A parallel holding part 66a which can hold the plurality of power source wires 52 in a parallel state is formed in a portion of the press plate part 66 on a side of the vehicle wheel side apparatus 28. The parallel holding part 66a is formed into a concave shape when viewed from the base plate part 65. The parallel holding part 66a is formed by performing press working on a metal plate material, for example. The parallel holding part 66a has a depth of substantially a diameter of the plurality of power source wires 52, and is formed to have a width of substantially a total parallel width of the plurality of power source wires 52. Thus, when the plurality of power source wires 52 are disposed between the base plate part 65 and the parallel holding part 66*a* of the press plate part 66, the plurality of power source wires 52 are kept in a parallel state.

A connector 51 is provided to tip end portions of the plurality of power source wires 52. The tip end portions of the plurality of power source wires 52 are introduced to be arranged in a row into the connector 51. The connector 51 is formed into an elongated rectangular parallelepiped shape in a direction in which the plurality of power source wires 52 are arranged. The other side connector which can connect the connector 51 in a constant posture (a posture along an up-down direction herein) is formed in the vehicle wheel side apparatus 28. The connector 51 is connector-connected to the vehicle wheel side apparatus 28, thus the connector 51 is kept in a posture along the up-down direction. The plurality of power source wires 52 extending from the connector 51 is also kept in a parallel posture along the up-down direction. The plurality of power source wires 52 may be connected to connectors different from each other. In this case, it is sufficient that the other side connectors corresponding to the connectors, respectively, are provided in tandem to the vehicle wheel side apparatus 28. Then, the plurality of connectors may be separately connected to the other side connectors, respectively, thereby being held in tandem.

In this manner, a portion of the parallel section E1 on a side of the lower support part 64 is kept in a parallel state to be arranged in tandem by the lower support part 64, and a portion thereof on a side of the vehicle wheel side apparatus 28 is kept in a parallel state to be arranged in tandem by the connector 51. Accordingly, the plurality of power source wires 52 are kept in a parallel state along the same route when viewed along the steering rotation central axis X in the parallel section E1.

In an intermediate portion of the parallel section E1, the plurality of power source wires 52 may be in a separate state or a state of being connected to be kept in a parallel state. For example, the plurality of power source wires 52 may be housed in a corrugate tube having an oval shape or a resin tube to be collected in a flat form. The plurality of power source wires 52 may have a form of a flat power source cable in which a resin portion of the power source wires 52 are integrally connected to each other in the parallel section E1.

A portion of the wiring member 50 extending along the steering rotation central axis X may be formed into a shape closer to a circle than an outer shape of the wiring member 50 in the parallel section E1.

Herein, the plurality or power source wires 52 are collected together by a protection member 54 in a section E2 along the steering rotation central axis X in the wiring member 50. For example, the protection member 54 may be a corrugate tube, an adhesive tape helically wound, a sheath extrusion covered to cover the power source wire 52, or a resin tube. Three or more power source wires 52 are parallelly arranged in the parallel section E1, and are collected by the protection member 54 descried above so as to have a form closer to a circular shape. Accordingly, a portion of the wiring member 50 extending along the steering rotation central axis X has a shape closer to a circle than an outer shape of the wiring member 50 in the parallel section E1. Herein, the outer shape of the wiring member 50 is formed into a circular shape.

A part of the press plate part 66 directed to the upper support part 62 is formed in a circular holding part 66*b* concaved to have a U-like shape. The circular holding part 66*b* is formed to have substantially the same depth and width as a diameter of the wiring member 50 in the section E2. Thus, a lower end portion of a portion of the wiring member 50 extending along the steering rotation central axis X is disposed between the base plate part 65 and the circular holding part 66*b* of the press plate part 66, thus a portion of the wiring member 50 directed to the upper support part 62 is held in a state of not rotatable with respect to the lower support part 64.

As described above, the lower support part 64 is supported on the side of the vehicle wheel 20, thus when the vehicle wheel 20 is rotated around the steering rotation central axis X, the lower support part 64 is also rotated in accordance with the rotation of the vehicle wheel 20. Then, twisting force acts on a portion of the wiring member 50 extending along the steering rotation central axis X on an upper side of the lower support part 64. In the section E2, when the outer shape of the wiring member 50 is close to a circular shape, the wiring member 50 can be easily twisted and deformed.

The outer shape of the wiring member 50 is not necessarily close to a circular shape in the section E2. The plurality of power source wires 52 may be parallelly arranged also in the section E2. The plurality of power source wires 52 need not be collected together in the section E2. For example, the protection member 54 described above may be omitted.

The undercarriage wiring module 40 and the routing structure 30 of the undercarriage wiring module having such configurations, the wiring member 50 includes the parallel section E1 in which the plurality of power source wires 52 are parallelly arranged, and in the parallel section E1, the plurality of power source wires 52 are parallelly arranged along the same route when viewed along the steering rotation central axis X (refer to FIG. 4). Thus, force hardly acts on the plurality of power source wires 52 in the different directions while the plurality of power source wires 52 are routed toward the vehicle wheel side apparatus 28. Accordingly, excessive force hardly acts on the area between the plurality of power source wires 52 and the connection destination of the plurality of power source wires 52, for example.

For example, assumed is a case where the plurality of power source wires 52 extend along the different routes when viewed along the steering rotation central axis X. In this case, the plurality of power source wires 52 cannot be disposed along the same route at the same time when viewed along the steering rotation central axis X. For example, when some power source wire 52 extends along an ideal route (for example, a straight shortest route directed from the steering rotation central axis X toward the vehicle wheel side apparatus 28), the other power source wire 52 needs to extend along a bended route to be away from the power source wire 52 extending along the ideal route. In this case, there is a possibility that excessive force acts on the area between those power source wires 52 or a common connection destination. In the present embodiment, the plurality of power source wires 52 are parallelly arranged along the same route when viewed along the steering rotation central axis X in the parallel section E1, thus force in the different directions hardly acts on the plurality of power source wires 52. Particularly, portions of the plurality of power source wires 52 in the parallel section E1 are routed straight with a shortest distance along a common route when viewed along the steering rotation central axis X, thus force in the different directions hardly acts on the plurality of power source wires 52.

When the wiring member 50 goes through the steering rotation central axis X and the parallel section E1 is set between the steering rotation central axis X and the vehicle wheel side apparatus 28 in the wiring member 50, the wiring member 50 can be disposed with a short distance from the steering rotation central axis X toward the vehicle wheel side apparatus 28 when viewed along the steering rotation central axis X. When the vehicle wheel 20 is rotated with the steering, the distance between the plurality of power source wires 52 is hardly changed, and the wiring member 50 itself is hardly deformed to be bended.

A more specific example is described with reference to FIG. 4. In FIG. 4, the vehicle wheel side apparatus 28 and the wiring member 50 directed to the vehicle wheel side apparatus 28 in a case where the vehicle body keeps traveling straight are illustrated by solid lines, and the vehicle wheel side apparatus 28 and the wiring member 50 directed to the vehicle wheel side apparatus 28 in a case where the vehicle body turns left and right are illustrated by alternate long and two short dashes lines. As illustrated in FIG. 4, when the vehicle wheel 20 is rotated around the steering rotation central axis X, the vehicle wheel side apparatus 28 as a connection destination of the wiring member 50 is rotated around the steering rotation central axis X. Thus, a distance from the steering rotation central axis X and the vehicle wheel side apparatus 28 is kept as constant as possible. The wiring member 50 goes through the steering rotation central axis X, and is connected to the vehicle wheel side apparatus 28, thus even when the vehicle wheel 20 is rotated around the steering rotation central axis X, a portion of the wiring member 50 going through the steering rotation central axis X to a portion thereof reaching the vehicle wheel side apparatus 28 keeps having a length L, as constant as possible. Thus, force of expanding and shrinking the wiring member 50 hardly acts on the wiring member 50 when the vehicle wheel 20 is rotated with steering, and bending deformation of the wiring member 50 is suppressed. As a result of suppression of the bending deformation of the wiring member 50, the wiring member 50 has a longer life.

The configuration that the plurality of power source wires pass through the same route when viewed along the steering rotation central axis X has an advantage also in a case where the plurality of power source wires cannot completely follow the rotation of the vehicle wheel with steering or a case where the plurality of power source wires do not go through the steering rotation central axis X even when the plurality of power source wires are set to go through the steering rotation central axis X.

For example, the plurality of power source wires are assumed to pass through the different routes when viewed along the steering rotation central axis X. In this case, there is a possibility that bending forms of the plurality of power source wires are different from each other in accordance with the rotation of the vehicle wheel 20 with the steering. In order to cope with this, a space for considering the bending forms of each of the plurality of power source wires may need to be ensured. In order to prevent this, the number of fixing positions of the plurality of power source wires is considered to be increased to regulate the bending forms. In this case, a large number of fixing positions need to be set. In the present embodiment, the space for considering the bending deformation of the wiring member 50 can be made as small as possible. The fixing positions can also be reduced. As a result, space saving and weight saving of the undercarriage wiring module 40 can be achieved.

The wiring member 50 in the parallel section E1 described above is observed as a thin member when viewed along the steering rotation central axis X. Thus, the wiring member in the parallel section E1 can be easily deformed in accordance with the movement of the vehicle wheel 20 around the steering rotation central axis X, that is to say, the positional change in the plane perpendicular to the steering rotation central axis X. Thus, even when the wiring member 50 in the parallel section E1 is bended and deformed in accordance with the movement of the vehicle wheel 20 around the steering rotation central axis X, the wiring member 50 can have a longer life.

The wire-like transmission member parallelly arranged in the parallel section E1 may not be all of the wire-like transmission members included in the wiring member 50. However, it is sufficient that the plurality of power source wires 52 are parallelly arranged in the parallel section E1. The power source wire 52 which tends to be thick compared with the signal wire, for example, is hardly bended. The power source wires 52 are parallelly arranged, thus force in the different directions hardly acts on each power source wire 52.

In this case, when a part of the wiring member 50 extends along the steering rotation central axis X, a portion of the wiring member 50 extending along the steering rotation central axis X can be twisted over a wide range in accordance with the rotation of the vehicle wheel with the steering, thus the wiring member 50 further has a longer life.

When a portion of the wiring member 50 extending along the steering rotation central axis X is formed into the shape closer to the circle than the outer shape of the wiring member 50 in the parallel section E1, the portion of the wiring member 50 extending along the steering rotation central axis X can be easily twisted.

Figure 6:
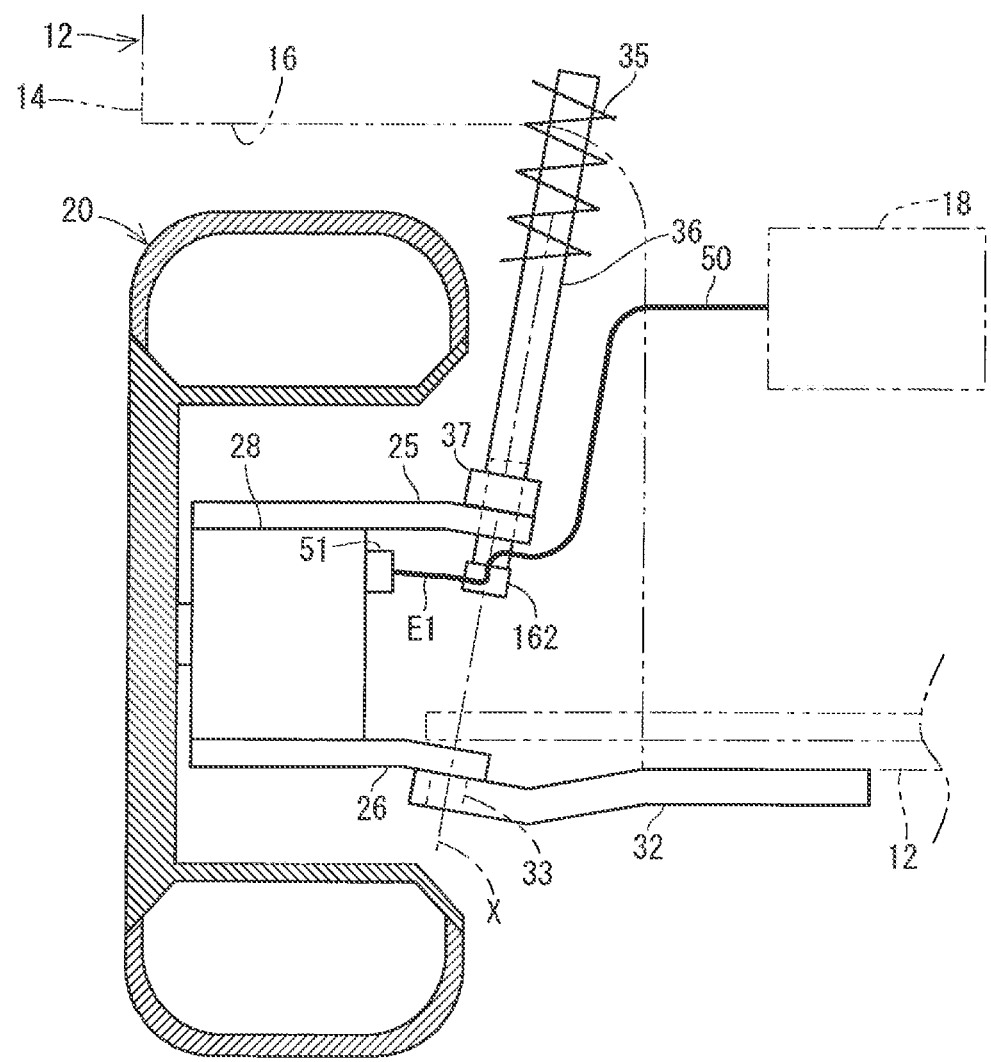
FIG. 6 is a schematic cross-sectional view illustrating a support member according to a modification example.

The lower support part 64 is not necessarily provided. The upper support part 62 is not necessarily supported on the side of the vehicle wheel 20. For example, as with a modification example illustrated in FIG. 6, the lower support part 64 may be omitted in the embodiment described above. Adoptable as an upper support part 162 corresponding to the upper support part 62 is a configuration of supporting the plurality of power source wires 52 in a parallel state in a portion of the wiring member 50 directed from the steering rotation central axis X to the vehicle wheel side apparatus 28 in the manner similar to the lower support part 64 described above. In the present modification example, a portion of the wiring member 50 directed from the upper support part 162 to the vehicle wheel side apparatus 28 is the parallel section E1.

In the case of the present modification example, the upper support part 162 is supported by the dumper 36, thus even when the vehicle wheel 20 is rotated around the steering rotation central axis X, the upper support part 162 is not rotated. When the vehicle wheel 20 is rotated around the steering rotation central axis X, the parallel section E1 in the wiring member 50 can be bended and deformed. However, in the parallel section E1, the plurality of power source wires 52 are parallelly arranged to extend along the direction intersecting with the steering rotation central axis X and extend along the virtual plane including the steering rotation central axis X. Thus, the plurality of power source wires 52 in the parallel section E1 can be easily bended and deformed in accordance with the rotation of the vehicle wheel 20 around the steering rotation central axis X.

That is to say, the configuration that at least two power source wires 52 are parallelly arranged to extend along the same route when viewed along the steering rotation central axis X in the parallel section E1 is also effective as the configuration that the wiring member 50 is bended and deformed in the parallel section E1 in accordance with the rotation of the vehicle wheel 20 with the steering.

Each configuration described in the embodiment and each modification example can be appropriately combined as long as they are not contradictory.

EXPLANATION OF REFERENCE SIGNS 10 vehicle body
12 floor part
14 body part
16 fender apron
18 vehicle body side apparatus
19 steering wheel
19a steering shaft
19b transmission mechanism
20 vehicle wheel
22 wheel
22a disk part
22b tire attachment part
24 tire
25 upper knuckle part
26 lower knuckle part
26a arm part
28 vehicle wheel side apparatus
28a shaft
30 routing structure
32 lower arm
33 bearing part
35 spring
36 dumper
37 bearing part
38 tie rod
40 undercarriage wiring module
50 wiring member
50a part of wiring member
51 connector
52 power source wire (wire-like transmission member)
52a core wire
52b covering
54 protection member
60 support member
61 extension support part
62 upper support part
63 extension support part
64 lower support part
65 base plate part
66 press plate part
66a parallel holding part
66b circular holding part
162 upper support part
C minimum inclusion circle
E1 parallel section
E2 section
L constant length
X steering rotation central axis

The invention claimed is:

1. An undercarriage wiring module, comprising:
a knuckle extending from a vehicle wheel side apparatus;
a bearing rotatably supporting the knuckle;
a wiring member connecting a vehicle body side apparatus and the vehicle wheel side apparatus; and
a support member supporting the wiring member, wherein
the wiring member includes a plurality of wire-like transmission members,
the wiring member includes a parallel section in which at least two of the plurality of wire-like transmission members are parallelly arranged,
in the parallel section, the at least two of the plurality of wire-like transmission members are parallelly arranged to extend along a same route when viewed along a steering rotation central axis being a rotational axis of the bearing,
in the parallel section, the at least two of the plurality of wire-like transmission members are configured to be deformed in accordance with movement of a vehicle wheel around the steering rotation central axis, and
the support member fixes the wiring member relative to a vehicle body at a first position of the wiring member while a second position of the wiring member is connected to the vehicle wheel side apparatus and rotates with the vehicle wheel around the steering rotation central axis, thereby causing the at least two of the plurality of wire-like transmission members in the parallel section to deform between the first and second positions during steering rotation.

2. The undercarriage wiring module according to claim 1, wherein
the at least two of the plurality of wire-like transmission members are power source wires.

3. The undercarriage wiring module according to claim 1, wherein
the support member supports the wiring member so that the wiring member goes through the steering rotation central axis, and
the parallel section is set between the steering rotation central axis and the vehicle wheel side apparatus in the wiring member.

4. The undercarriage wiring module according to claim 3, wherein
the support member supports the wiring member so that a part of the wiring member extends along the steering rotation central axis.

5. The undercarriage wiring module according to claim 3, wherein
a portion of the wiring member extending along the steering rotation central axis is formed into a shape closer to a circle than an outer shape of the wiring member in the parallel section.

* * * * *